United States Patent
Balinsky et al.

(10) Patent No.: US 9,600,448 B2
(45) Date of Patent: Mar. 21, 2017

(54) DOCUMENT MANAGEMENT SYSTEM AND METHOD

(75) Inventors: Helen Balinsky, Cardiff (GB); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 905 days.

(21) Appl. No.: 13/885,953

(22) PCT Filed: Jan. 28, 2011

(86) PCT No.: PCT/US2011/023068
§ 371 (c)(1),
(2), (4) Date: Dec. 2, 2014

(87) PCT Pub. No.: WO2012/102736
PCT Pub. Date: Aug. 2, 2012

(65) Prior Publication Data
US 2015/0169500 A1 Jun. 18, 2015

(51) Int. Cl.
*G06F 17/30* (2006.01)
*G06F 17/21* (2006.01)
(Continued)

(52) U.S. Cl.
CPC ...... *G06F 17/211* (2013.01); *G06F 17/30011* (2013.01); *G06Q 10/06* (2013.01); *G06Q 10/103* (2013.01)

(58) Field of Classification Search
USPC .................. 713/189, 193, 165; 707/608, 636
See application file for complete search history.

(56) References Cited

U.S. PATENT DOCUMENTS 7,587,368 B2 9/2009 Felsher
7,831,827 B2 11/2010 Walmsley
(Continued)

FOREIGN PATENT DOCUMENTS

JP 6-004534 1/1994
JP 2004-246734 9/2004
(Continued)

OTHER PUBLICATIONS

Jeff Turner et al, "Unordered Workflow Transistions eg. issue approval", JIRA Community Space—Atlassian Documentation.

*Primary Examiner* — Hung T Vy
(74) *Attorney, Agent, or Firm* — Dierker & Kavanaugh, P.C.

(57) ABSTRACT

Document management system includes a composite document (CD) and a mixed workflow, which includes an unordered stage followed by one of i) an ordered stage or ii) another unordered stage. The system includes a map-file (map) of the document (CD) for a participant (P) in the mixed workflow that is associated with the ordered or other unordered stage, and a wrap (W) of the map-file (map). Wrap (W) includes a number of map-file fragments (F) equal to or greater than a number of workflow participants (P) within a group (G) associated with the unordered stage. The number of map-file fragments (F) renders the document (CD) inaccessible to the participant (P) that is associated with the ordered or other unordered stage until each of the number of map-file fragments (F) is released by each of the workflow participants (P) within the group (G).

14 Claims, 4 Drawing Sheets

(51) Int. Cl.
    *G06Q 10/06*        (2012.01)
    *G06Q 10/10*        (2012.01)

(56)             References Cited

U.S. PATENT DOCUMENTS

| | | |
|---|---|---|
| 7,831,829 B2 | 11/2010 | Appenzeller et al. |
| 8,656,181 B2 * | 2/2014 | Balinsky .................. H04L 9/14 |
| | | 707/705 |
| 9,020,892 B2 * | 4/2015 | Chan ................ G06F 17/30132 |
| | | 707/636 |
| 9,020,893 B2 * | 4/2015 | Zalpuri ............ G06F 17/30174 |
| | | 707/636 |
| 2002/0156808 A1 * | 10/2002 | Duffy .................. G06F 17/243 |
| | | 715/234 |
| 2003/0236838 A1 | 12/2003 | Ouchi |
| 2004/0078258 A1 | 4/2004 | Schulz et al. |
| 2004/0162741 A1 | 8/2004 | Flaxer et al. |
| 2007/0156888 A1 | 7/2007 | Hilerio et al. |
| 2007/0276714 A1 | 11/2007 | Beringer |
| 2007/0288258 A1 | 12/2007 | Beringer et al. |
| 2012/0290849 A1 * | 11/2012 | Simske ................. H04L 9/3247 |
| | | 713/189 |

FOREIGN PATENT DOCUMENTS

| | | |
|---|---|---|
| JP | 2010-191519 | 9/2010 |
| KR | 20100084644 | 7/2010 |

* cited by examiner

DOCUMENT MANAGEMENT SYSTEM AND METHOD

BACKGROUND

The present disclosure relates generally to a document management system and method.

Many documents have become a mixture, or a composite, of differentially formatted parts. Composite documents may be presented to a user by specialized software as one editable, browsable, approvable, playable document. Different parts are combined together through various serialization mechanisms, e.g. java jar-archive, HP dlf, etc. One example of a composite document is a document-based proposal, including product jpeg-images, a marketing way-clip, a ppt-presentation and an xsl-spreadsheet with financial details.

Composite documents can participate in workflows. A workflow includes a defined set of stages, usually with task(s) at each stage, which the composite document must pass through during its lifecycle. One example of a workflow is an ordered workflow, where the composite document passes from one participant to the next in a particular order. Another example of a workflow is an unordered workflow, where participants may access the composite document in any order and at any time. Still another example of a workflow is a mixed or combinational workflow, where one or more stages of the workflow are ordered and one or more stages of the workflow are unordered. Changing from unordered stages to ordered stages poses challenges in ensuring that every workflow participant taking part in an unordered stage has contributed and/or performed his/her task(s) before the next ordered stage or unordered stage begins.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the document management system and method disclosed herein are used to ensure that every participant at a particular stage in a workflow accesses and/or contributes before the composite document is propagated along the workflow. In particular, the system(s) and methods disclosed herein ensure that every participant contributing at an unordered stage of the workflow has contributed, before the composite document is propagated to the next stage, whether the next stage is ordered or unordered. This prevents the composite document from being accessible by the next participant(s) too early, and thus also prevents accidental diversion of the composite document in the workflow. If the composite document is inadvertently sent to the next participant too early, the examples disclosed herein ensure that the participant is unable to recover his/her map-files and thus is unable to access the document content.

As mentioned above, the term "workflow" refers to a defined set of stages, usually with task(s) at each stage, which a composite document must pass through during its lifecycle. A composite document is a document including several items (e.g. PDFs, PPTs, DOCs, etc.). In one example, the workflow is an automated process during which documents, information, and/or tasks are passed from one participant to another for action or informative purposes, according to a set of procedural rules. Workflows include imaging workflows (e.g., quality assurance, authentication, forensics, etc.), supply chain workflows (e.g., track and trace, inspection, shipping/receiving, recall, etc.), environmental or sensor data monitoring workflows, or other suitable workflows (e.g., statistics (e.g., inventory, etc.), compliance, auditing, etc.). In other words, a workflow is any defined set of tasks to complete associated with a composite document. In one example, a workflow involves a digital document whose content parts are accessed, changed, and/or updated at every workflow step/stage.

Also as mentioned above, the workflow may be ordered, unordered, or mixed. An ordered workflow is one in which the composite document passes from one participant to the next in a particular order. In ordered workflows, the map-files of the participants are wrapped into a binary blob that corresponds to the order of access. An unordered workflow is one in which the workflow participants can access the composite document in any order. In unordered workflows, all of the map-files are placed in the root of the composite document and are accessible by any workflow participant at any time. A mixed workflow includes stages that are ordered and unordered. In ordered stages, the composite document is accessible by one particular participant at that particular workflow stage/step, and in unordered stages, the composite document is accessible to multiple participants of a group simultaneously. A mixed workflow is a workflow that includes interleaved ordered and unordered stages/steps. A mixed workflow can include any number of steps, and in one example, includes two sequential steps where the document access is transitioned from an ordered stage to an unordered stage, an unordered stage to an ordered stage, or an unordered stage to another unordered stage.

Figure 1A:
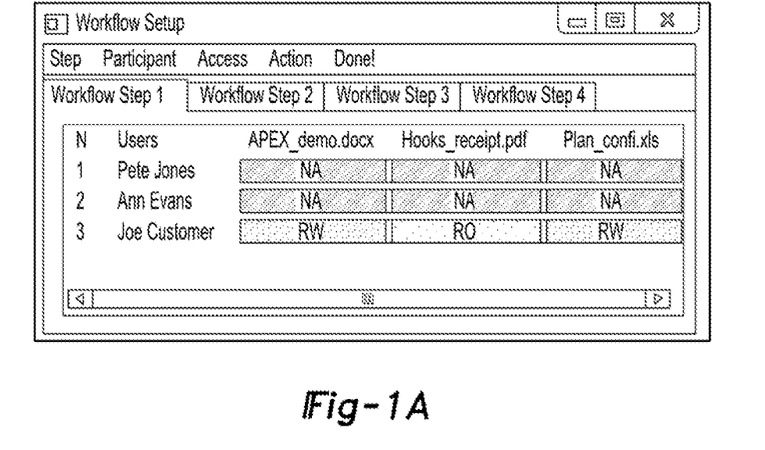
FIGS. 1A through 1D are illustrations of example screen shots of a workflow application, where the generated workflow is a mixed workflow.
Figure 1B:
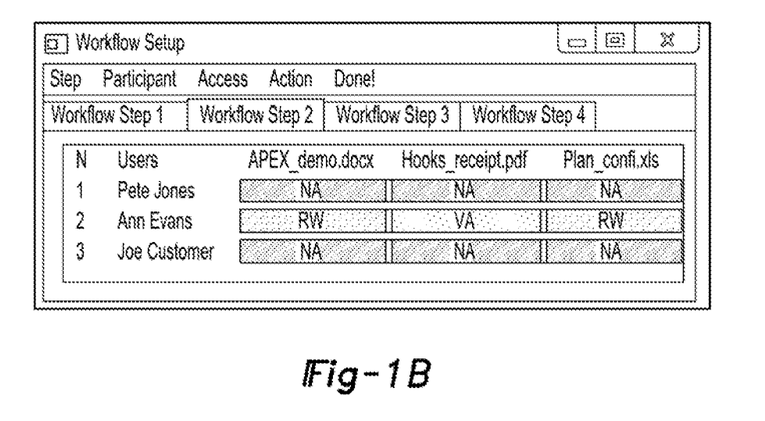
Figure 1C:
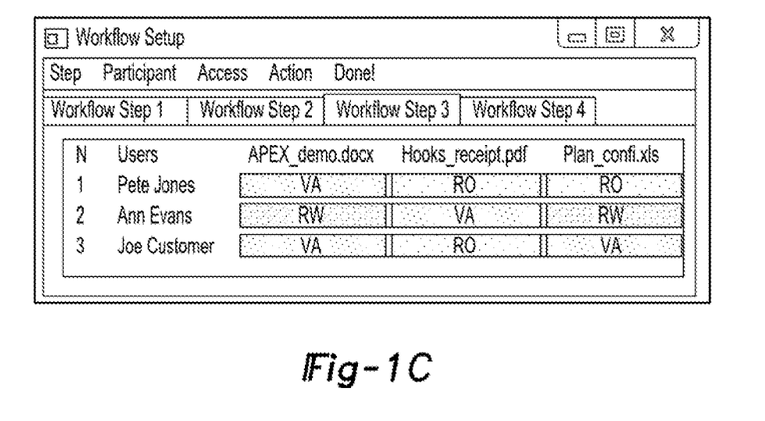

FIGS. 1A through 1D illustrate screen shots of a workflow application run via a processor, where the generated workflow is a mixed workflow of ordered stages and unordered stages. FIGS. 1A and 1B correspond to ordered workflow steps/stages. For example, at workflow step 1 shown in FIG. 1A, Joe Customer is authorized to access the document, which includes a .docx file, a .pdf file, and an .xls file. As illustrated, Joe Customer is given Read/Write (RW) or Read Only (RO) access to the various files of the composite document, while Pete Jones and Ann Evans have no access (NA) at this stage. In this workflow, no other participant can access the composite document before Joe Customer makes his contribution. Once Joe Customer finishes, the transfers the document to Ann Evans, who is the single participant in workflow step 2. Similar workflow enforcement applies at workflow step 2 because Ann Evans alone can access the composite document at this step. As shown in FIG. 1B, Ann Evans is given Read/Write (RW) access or Validate Access (VA) to the various files of the composite document, while Pete Jones and Joe Customer have No Access (NA). Validate Access corresponds to a situation where a participant receives the full document and parts with validate access are not accessible for Reading/Writing. As such, when given validate access, a participant has to verify authenticity of such parts without getting access to the part contents.

Figure 1D:
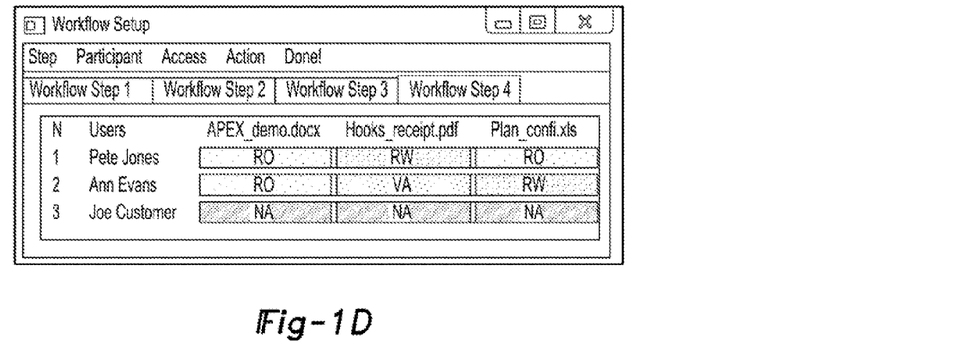

Once the document moves to the workflow step 3 (see FIG. 1C), any of the participants may access the document in any order according to the access granted to them at this step. For example, at this step, Pete Jones can only read Hooks_receipt.pdf and plan_confi.xsl and has validate access to APEX_demo.docx. Workflow step 3 corresponds to an unordered workflow step/stage, and thus the transition from step 2 to step 3 is ordered to unordered. As illustrated in FIG. 1D, workflow step 4 is also an unordered step because two of the participants may access the document in any order according to the access granted to them at this step. As such, the transition from step 3 to step 4 is a transition from one unordered step to another unordered step. The transitions between the stages of a mixed workflow will be described further in reference to FIGS. 2 through 6.

As illustrated in FIGS. 1A through 1D, the workflow participant(s) at the various steps is/are provided with the entire composite document, although one or more files of the composite document may be accessible for reading only (RO), accessible for reading and writing (RW), accessible with validate access (VA), or not accessible (NA). It is desirable to provide the entire composite document to each participant because later participant(s) in the workflow may require access to parts that an earlier workflow participant cannot access.

In the examples disclosed herein, the composite document includes i) individual content items/parts (e.g., files), and ii) a wrap, which, as it is unwrapped, sequentially delivers individual map-files according to a workflow order. Examples of other composite documents include i) individual content items/parts (e.g., files), and ii) individual map-files allowing multiple participants to access the composite document in any desired order. A "map-file" is a subset of access keys to document parts corresponding to the access granted to a particular participant, where each map-file is encrypted and signed for each participant individually. A "wrap" creates a mandatory workflow entry by wrapping access control data in the form of map-files starting from the last workflow participant moving through the workflow to the first workflow participant. In general, a wrap is created by i) computing for the last (e.g., $N^{th}$) workflow participant $Enc_{sN}(map_N)$, ii) then computing for the (N−1) workflow participant, and each subsequent participant, a suitable form of $Enc_{sN-1}(map_{N-1}+Enc_{sN}(map_N))$, and then iii) computing for the first workflow participant $Enc_{s1}(map_1+Enc_{s2}(map_2)+ \ldots +Enc_{sN-1}(map_{N-1})+Enc_{sN}(map_N))$. The map-files (e.g., $map_N$) are encrypted by keys, which are respectively available to/known by the corresponding participant alone. The wrap is placed into the original version of the document shipped to the first workflow participant. As will be discussed further hereinbelow, the binary data from the wrap may be split into fragments in order to ensure proper workflow order. As such, the wrap is a mechanism for enforcing an ordered workflow, and/or for ensuring that at each workflow step/stage, the document can be accessed by the corresponding workflow participant and cannot be accessed by a workflow participant before or after his/her workflow step.

In some instances, the composite document may also include an entry table, which is a fast filtration mechanism to identify a participant's map-file without exposing the participant's identity. This involves encrypting a small known string of characters for each workflow participant. Each user attempts to decrypt the strings until the correctly decrypted string is found. For ordered workflow steps, the wrap will release exactly one map-file and therefore an entry table may not be used. However, for unordered workflow steps, the wrap will release two or more map-files (so that each participant can access the document independently). The entry table provides a mechanism to determine which map-file is for which user. In order to provide controlled differential access to a content part, the part is encrypted by its own specially-generated and assigned encryption key E. An extra pair of keys for each part is provided, namely a signature key S and a signature verification key V. The access control for a composite document part is thus enabled by 4 keys: $\{\{E, D\}, \{S, V\}\}$, where D is the decryption key. Read only access is controlled by having or not having decryption key D. Read and write access requires three keys E, D, S. An item will be decrypted using D, modified as needed, encrypted using E and then signed using S. A user without any granted access to an item is given a signature verification key V that will allow the user to validate item authenticity (this validate access corresponds to "VA" in FIG. 1).

As such, every content part of a composite document is signed by its own signature key S, and every workflow participant is securely given the corresponding signature verification key V for each item, irrespective of the type of granted access. Upon reception, every workflow participant verifies the signature of every item using the corresponding signature verification key. Participants can access for reading only those parts for which he/she is given the corresponding decryption key D and can modify only those parts for which he/she is given E, D and S. The user uses E to encrypt modified contents and generate a new signature using S, which is validated by the subsequent workflow participant. It is to be understood that the scheme can be simplified using symmetric encryption, where E=D.

As illustrated in FIGS. 1A through 1D, a workflow may involve numerous participants, many or all of whom do not know the other participants. In the examples disclosed herein, the composite document that is the subject of the workflow may be transferred between workflow participants by any available channel, including, for example, electronic mail (e-mail), any publicly shared memory device (e.g., a compact disc (CD), a digital video disk (DVD), a universal serial bus (USB) key, etc.), public posting systems (e.g., cloud computing systems where documents may be uploaded and downloaded, file sharing systems (e.g., Sharepoint, etc.)), or the like. As such, the secure composite document is expected to be delivered over a potentially non-secure channel. The previously mentioned map-files are used to accomplish this delivery. One map file is generated for each workflow participant for each step. A map file consists of one entry per document part. Each entry contains the part name/id and the subset of the keys corresponding to access right granted to the workflow participant for the particular part. Entries include: 1) read/write access; item name, $E_i$, $D_i$, $S_i$, $V_i$, 2) read only access; item name, $D_i$, $V_i$, and 3) no access: item name, $V_i$. Map-files may be in any format, including, for example, xml, comma-separated values (CSV), SQL, etc.

In the examples of the method disclosed herein, the wraps are used to enforce the transition of a composite document between stages of a mixed workflow. The document management system utilized to perform examples of the method disclosed herein includes a secure authoring tool and one or more individual computing systems that perform one or more steps of the method disclosed herein. The secure authoring tool enables the document master to generate the composite document, map-file(s), and wrap(s) corresponding to the workflow. The document master version of the document is exported and shipped among workflow participants via any available channel.

The individual computing systems may be stationary (e.g., desktop computers) or mobile (e.g., laptop computers, netbooks, cellular phones, personal digital assistants (PDAs), etc.)). The individual computing systems run one or more applications that enable the user to obtain access to part(s) of the composite document according to preset (granted) access rights and according to an order that is created by the document master. The individual computers are also able to perform encryption, decryption, signature verification, and/or signing.

In one example, the secure authoring tool is associated with a system that enables the composite documents to be uploaded and downloaded, or to be shared via a shared drive or a cloud computing network. In this example, a variety of workflow participants can access the composite documents from individual computers by accessing the shared drive or cloud computing network. The secure authoring tool may also be accessible via the Internet and unassociated with any particular shared drive or cloud computing network. In these instances, document(s) are transmitted via publicly shared memory devices, such as CDs, DVDs, USBs, etc. or via any other suitable channel.

When included as part of the system, the shared drive or cloud computing network may be associated with a network of interconnected computers and/or other electronic devices (e.g., scanners, printers, etc.), including virtualized and/or redundant processors, banks of processors and/or servers, etc. It is to be understood that the components of the shared drive or cloud computing network may be implemented in a consolidated location, or portion(s) of the shared drive or cloud computing network may be implemented at different locations. In one example, the shared drive or cloud computing network is a virtualized bank of computers (e.g., processors and/or servers) that enables Internet-based computing (through which the secure authoring tool can be accessed). Software and data associated with the shared drive or cloud computing network are stored on servers and their associated memory.

The hardware of the shared drive or cloud computing network and of the individual computing devices performing steps of the method include an electronic processing device, such as, for example, a controller, a micro controller, a microprocessor, a host processor, an application specific integrated circuit (ASIC), and/or a reprogrammable hardware logic device (such as a field programmable gate array (FPGA)). It is to be understood that the electronic processing device may be a processor working in conjunction with a central processing unit (CPU) performing the function of a general-purpose processor. Computer program(s) and/or software (e.g., computer readable code) may be loaded onto one or more of the computer/computing systems, and stored in a memory thereof. Such programs and/or software are executable via the processing device.

In any of the examples disclosed herein, the workflow may be generated by a workflow manager, administrator, etc. who utilizes the secure authoring tool to create the workflow. In some instances, the system may be programmed to automatically set up a workflow.

Figure 2:
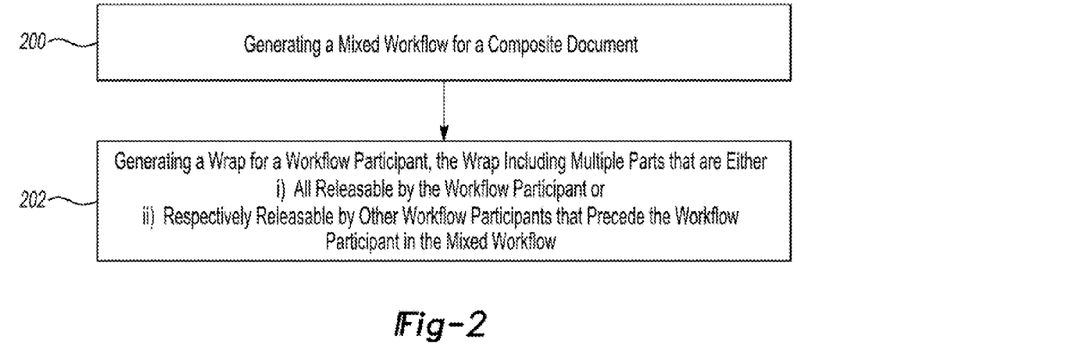
FIG. 2 is a flow diagram depicting an example of a document management method.

Referring now to FIG. 2, an example of the document management method is disclosed. The method includes generating a mixed workflow for a composite document (as shown at reference numeral 200) and generating a wrap for one or more workflow participants (as shown at reference numeral 202). The wrap includes multiple parts (e.g., map-files, map-file fragments, etc.) that are either i) all releasable by the workflow participant (see, e.g., FIG. 3) or ii) respectively releasable by other workflow participants that precede the workflow participant in the steps of the mixed workflow (see, e.g., FIGS. 5 and 6). More specific examples of the method shown in FIG. 2 will be described further in reference to FIGS. 3 through 6.

Figure 3:
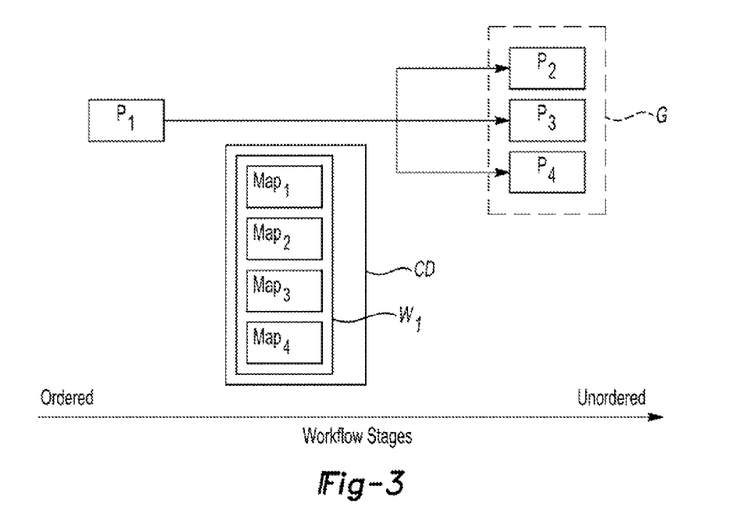
FIG. 3 is a schematic diagram illustrating an example of a mixed workflow going from an ordered stage to an unordered stage.

Referring now to FIG. 3, an example of a workflow including an ordered stage followed by an unordered stage is depicted. While two stages of the workflow are shown in FIG. 3, it is to be understood that the workflow may include any number of stages. The ordered stage involves one participant $P_1$. The participant $P_1$ performs his/her task(s) and releases the composite document CD (e.g., via one of the channels mentioned herein). The unordered stage involves a group G, which includes multiple participants (e.g., participants $P_2$, $P_3$, and $P_4$) that are allowed access to the composite document CD in no particular order after it has been released by participant $P_1$. As such, it is desirable that each of the workflow participants $P_2$, $P_3$, and $P_4$ in the group be able to access the composite document CD after it is released by participant $P_1$, but not before.

In this example, in order to ensure that the workflow is followed, and that participants $P_2$, $P_3$, and $P_4$ are able to access the composite document CD at their workflow step, access control data at each stage is wrapped in the form of map-files $map_1$, $map_2$, $map_3$, $map_4$ (i.e., a mechanism for differential access control, where at least one map-file is provided for each workflow participant at each stage). In this example, the workflow wrap $W_1$ of participant $P_1$ includes his/her own map-file $map_1$ and the map-files $map_2$, $map_3$, $map_4$ of the other participants $P_2$, $P_3$, and $P_4$. Each of the map-files $map_1$, $map_2$, $map_3$, $map_4$ is encrypted with corresponding key(s), which are specially generated keys for each participant $P_1$, $P_2$, $P_3$, and $P_4$. This ensures that the respective participants holding the respective keys are able to extract access keys (e.g., E, D, S, V) from his/her own map-files $map_1$, $map_2$, $map_3$, $map_4$. An example of the workflow wrap $W_1$ for participant $P_1$ is.

$$W_1 = Enc_{s1}(map_1 + Enc_{s2}(map_2) + Enc_{s3}(map_3) + Enc_{s4}(map_4))$$

In this example, the map-files $map_2$, $map_3$, $map_4$ of the participants $P_2$, $P_3$, $P_4$ are encrypted by s2, s3 and s4 keys, which are respectively available to/known by participants $P_2$, $P_3$, and $P_4$ alone. However, these encrypted map-files $map_2$, $map_3$, $map_4$ are combined with clear text map-file $map_1$, and this combination is encrypted to form wrap $W_1$ using key s1, which is available to/known by the participant $P_1$ alone. Thus, participant $P_1$ alone can decrypt the wrap $W_1$. Once he/she decrypts the wrap $W_1$, he/she obtains his/her map-file $map_1$ in clear text and the rest of the map-files $map_2$, $map_3$, $map_4$ in encrypted form, as described above. Participant $P_1$ uses the key(s) (e.g., from his/her map-file $map_1$ to access the document parts and to release (place) the encrypted map-files $map_2$, $map_3$, $map_4$ into the document serialization. At this point, the encrypted map-files $map_2$, $map_3$, $map_4$ are available for access by the respective participants $P_2$, $P_3$, and $P_4$ (who can decrypt them with respectively known keys) in the document serialization. It is to be understood that the application running on participant $P_1$'s computer automatically extracts the map-files $map_2$, $map_3$, $map_4$ for the participants $P_2$, $P_3$, and $P_4$ from the wrap $W_1$ and places the encrypted map-files $map_2$, $map_3$, $map_4$ into the document serialization automatically in response to the participant $P_1$ decrypting the wrap $W_1$ or subsequently when participant $P_1$ completes his job and triggers document release action. The presence of the map-files $map_2$, $map_3$, $map_4$ in the released document CD enables any of the participants $P_2$, $P_3$, and $P_4$ to access the document CD in any order, or even in parallel.

Figure 4:
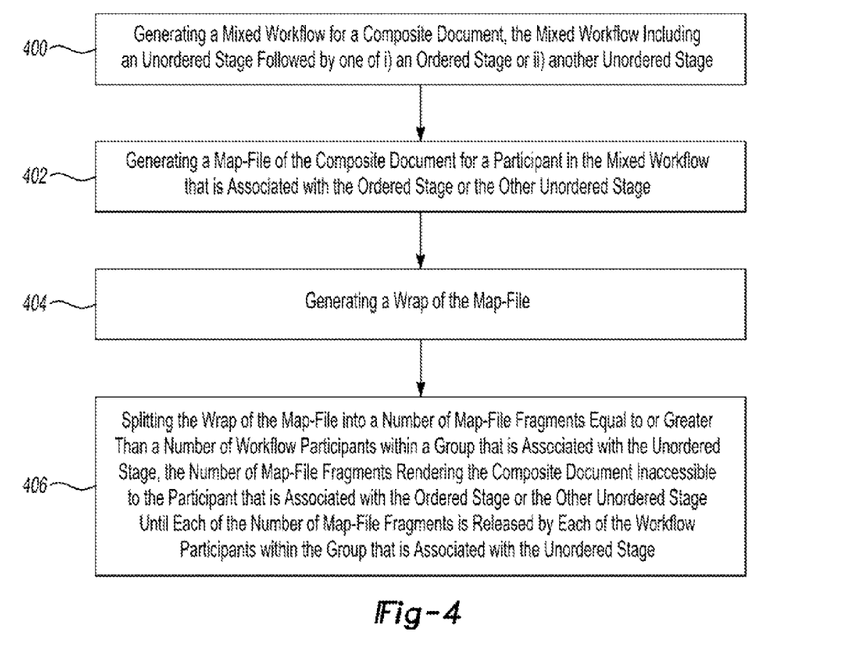
FIG. 4 is a flow diagram depicting another example of the document management method.

The system and method disclosed herein may be particularly suitable for managing workflows that include moving from an ordered stage to an unordered stage (as described above in reference to FIG. 3), moving from an unordered stage to an ordered stage, and/or moving from an unordered stage to another unordered stage. FIG. 4 illustrates an example of the document management method that involves moving from an unordered stage to an ordered stage and/or moving from an unordered stage to another unordered stage. Generally, this example of the method includes generating a mixed workflow for the composite document CD, where the mixed workflow includes an unordered stage followed by one of i) an ordered stage or ii) another unordered stage (see reference numeral 400); and generating a map-file (e.g., $map_1$, $map_2$, $map_3$, $map_4$ etc.) of the composite document CD for a participant in the mixed workflow that is associated with the ordered stage or the other unordered stage (see reference numeral 402). More generally, map-files are generated for each workflow participant at each step they are granted access.

Figure 5:
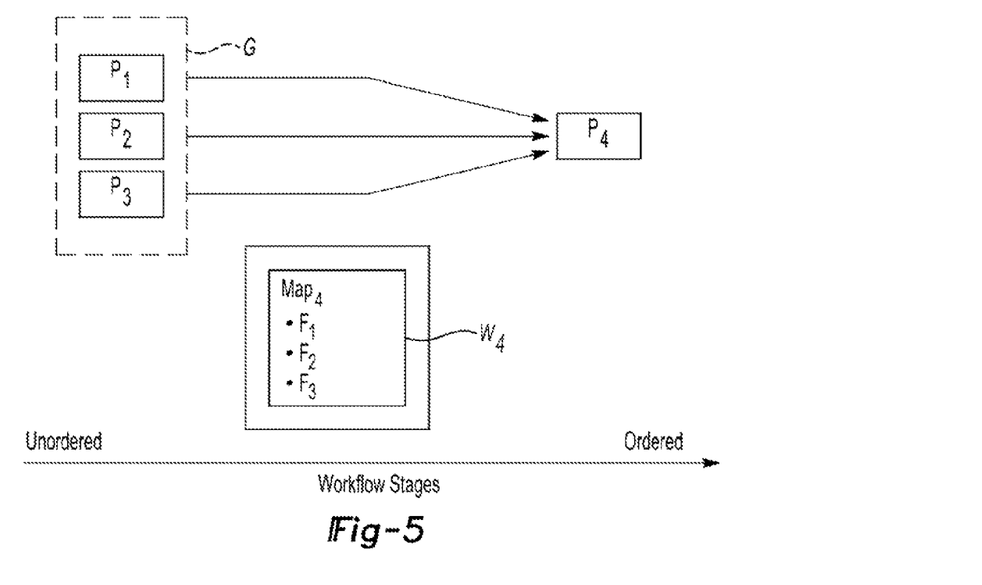
FIG. 5 is a schematic diagram illustrating an example of a mixed workflow going from an unordered stage to an ordered stage.
Figure 6:
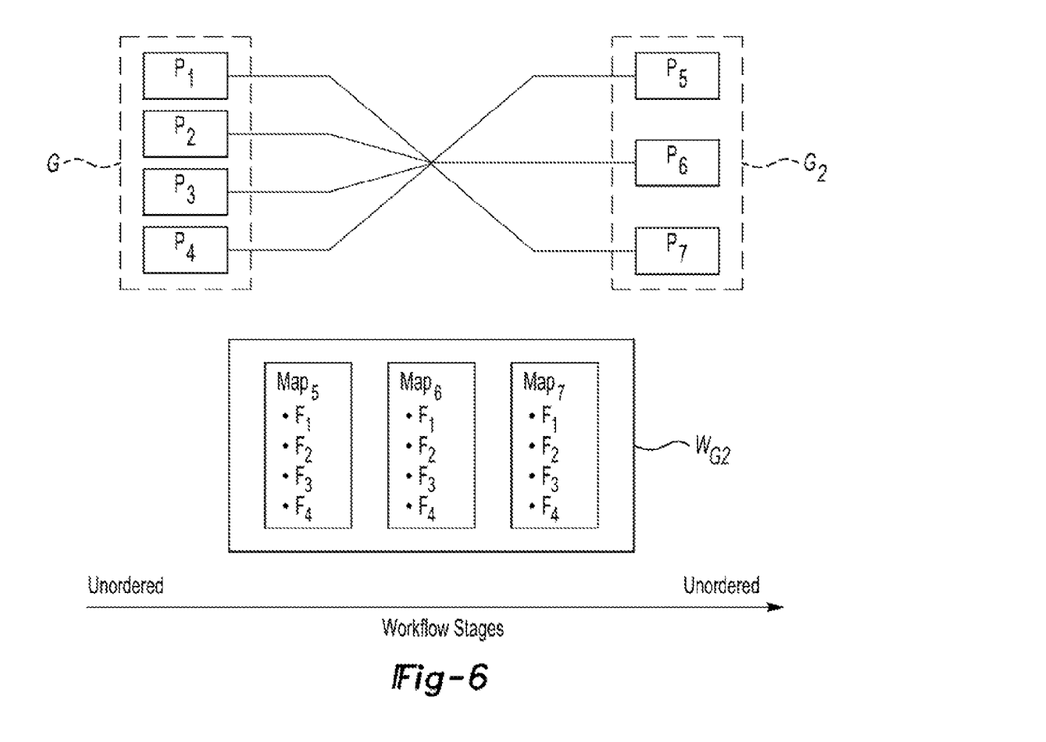
FIG. 6 is a schematic diagram illustrating an example of a mixed workflow going from an unordered stage to another unordered stage.

The example of the method shown in FIG. 4 further includes generating a wrap of the map-file (see reference numeral 404); and splitting the wrap of the map-file into a number of map-file fragments equal to or greater than a number of workflow participants within a group that is associated with the unordered stage (see reference numeral 406). Examples of the method shown in FIG. 4 will be further discussed in reference to FIGS. 5 and 6. While the examples shown in FIGS. 4 through 6 are for mixed workflows transitioning from an unordered step to an ordered step or an unordered step to another unordered step, it is to be understood that a mixed workflow is not limited to these examples. As mentioned above, a mixed workflow broadly encompasses any combination of ordered and unordered steps with at least one ordered step and at least one unordered step in any order or two different unordered steps.

Referring now to FIG. 5, an example of a workflow including an unordered stage followed by an ordered stage is depicted. While two stages of the workflow are shown in FIG. 5, it is to be understood that the workflow may include any number of stages. When moving from an unordered stage to an ordered stage, the composite document CD is released to a single participant (e.g., participant $P_4$ in FIG. 3) after each participant $P_1$, $P_2$, and $P_3$ from the group G has contributed (e.g., accessed the document CD, performed his/her tasks, etc.). It is to be understood that participant $P_4$ cannot access the parts(s) of the document CD before each or some (as required by the workflow) participant(s) $P_1$, $P_2$, and $P_3$ from the group G has/have contributed. As such, even if participant $P_4$ prematurely receives the document CD before any mandatory participants $P_1$, $P_2$, and $P_3$ have contributed, participant $P_4$ will not be able to access, his/her map-file $map_4$ or the content parts(s) within document CD. Similar to the example shown in FIG. 3, participant $P_4$ is associated with a map-file $map_4$ that he/she alone can decrypt to gain controlled access to the document CD. While it would be desirable for the last participant $P_1$, $P_2$, and $P_3$ from the group G to release the next participant's map-file $map_4$, the last participant $P_1$, $P_2$, and $P_3$ may be unknown since all of the participants $P_1$, $P_2$, and $P_3$ within the group G may access the document CD in a random order.

In this example, in order to ensure that the workflow is followed, and that participant $P_4$ is able to access the composite document CD during his workflow step/stage, the binary data of the wrap $W_4$ for participant $P_4$ is split into a number of map-file fragments $F_1$, $F_2$, and $F_3$. In this example, the number of fragments $F_1$, $F_2$, and $F_3$ is equal to or greater than the number of workflow participants $P_1$, $P_2$, and $P_3$ from the group G associated with the unordered stage directly preceding the ordered stage. As such, for the group G including three participants $P_1$, $P_2$, and $P_3$, the number of fragments $F_1$, $F_2$, and $F_3$ can be three or more.

It is to be understood that when the workflow includes additional stages beyond the ordered stage shown in FIG. 5, the wrap $W_4$ for participant $P_4$ includes the remainder of the workflow (i.e., for the subsequent participants).

In the example shown in FIG. 5, each participant $P_1$, $P_2$, and $P_3$ from the group G is assigned at least one of the fragments $F_1$, $F_2$, and $F_3$. Since the fragments $F_1$, $F_2$, and $F_3$ are respectively associated with the different participants $P_1$, $P_2$, and $P_3$ from the group G, each workflow participant $P_1$, $P_2$, and $P_3$ from the unordered group G can release his/her assigned fragment(s) $F_1$, $F_2$, and $F_3$ alone. As such, each participant $P_1$, $P_2$, and $P_3$ has to access the document CD (and, in some instances, perform his/her assigned task(s)) and then release his/her fragments $F_1$, $F_2$, and $F_3$. Additionally, all of the fragments $F_1$, $F_2$, and $F_3$ (and the corresponding bytes) have to be released before the full wrap $W_4$ of participant $P_4$ can be assembled and released. As such, participant $P_4$ cannot decrypt his wrap $W_4$ to access his map-file $map_4$ until all of the participants $P_1$, $P_2$, and $P_3$ from the group G have completed their task(s) and released their fragments $F_1$, $F_2$, and $F_3$. The split and re-assembled wrap $W_4$ for participant $P_4$ contains the rest of the workflow (if any e.g., map-file(s) of subsequent participant(s)) and is encrypted using a key known by or provided to participant $P_4$. This type of encryption helps to ensure that the participant $P_4$ alone can access the completely released composite document CD (i.e., the document CD after each participant $P_1$, $P_2$, and $P_3$ from the unordered group G has released his/her fragment(s) $F_1$, $F_2$, and $F_3$).

As an example of the scenario shown in FIG. 5, the wrap $W_4$ for participant $P_4$ may include total 10 kB. Since there are three participants $P_1$, $P_2$, and $P_3$ in the group G at the unordered stage, the number of fragments $F_1$, $F_2$, and $F_3$ may be selected to be three or more. As one example, the wrap $W_4$ may be divided into three fragments $F_1$, $F_2$, and $F_3$, where $F_{1=4}$ kB, $F_{2=3}$ kB, and $F_{3=3}$ kB. It is noted that the fragments $F_1$, $F_2$, and $F_3$ can be selected in a non-sequential way from the wrap and can be overlapping. As another example, the wrap $W_4$ may be divided into five fragments $F_1$, $F_2$, $F_3$, $F_4$, $F_5$ where each of the fragments $F_1$, $F_2$, $F_3$, $F_4$, $F_5$ equals 2 kB. In the latter example, two of the participants $P_1$, $P_2$, and $P_3$ in the group G are assigned two of the fragments $F_1$, $F_2$, $F_3$, $F_4$, $F_5$, and one of the participants $P_1$, $P_2$, and $P_3$ in the group G is assigned the other remaining fragment $F_1$, $F_2$, $F_3$, $F_4$, $F_5$. It is to be understood that the wrap $W_4$ may be split/partitioned in any other desired and/or suitable manner that renders partial block decryption impossible.

In one example, the fragments $F_1$, $F_2$, $F_3$, $F_4$, $F_5$ are defined by the application(s) that exports the composite document CD. The application may recognize the transition from an unordered workflow stage to an ordered workflow stage, and automatically generate an appropriate wrap with map-files and map-file fragments. A workflow administrator may be provided with the option (e.g., via on-screen prompts) to add extra information regarding, for example, group access (e.g., whether all or some participants from a group must access), mandatory and/or optional participants, or other workflow related information.

The release of the document CD may be automatic or following user command. This means that once a participant $P_1$, $P_2$, and $P_3$ has accessed the composite document CD, his/her fragment(s) $F_1$, $F_2$, and $F_3$ of the wrap $W_4$ for the next participant is/are automatically released or in response to a user command (through a graphical user interface, "gui"). In some instances, it may be desirable to afford a single participant or one or more of the participants $P_1$, $P_2$, and $P_3$ in the group G the opportunity for multiple sessions within the composite document CD. In these instances, the participant accesses his wrap, decrypts it and extracts his map-file, performs some functionality, and then two scenarios may occur. In one example, after the participant initially accesses the document, the original wrap remains in place unchanged, despite the fact that it was read to the memory and decrypted. As a result, the workflow step does not advance. Rather, in this example, the same participant needs to access the document again to release document access. In another example, after the participant initially accesses the document, the wrap is removed from the document and is replaced by the recovered map-files/wraps for the subsequent steps. In this example, the application can be programmed to release document control by default on the first access or in response to a user command. When document control release is set up in response to a user command, it may be desirable to provide the user the option of releasing the document CD at that point, or to save the document CD in its then-current state for later access. This level of control can be achieved by application control. For example, when a workflow participant saves his/her current work, the application can provide a pop-up window or a "release" button for the participant to release his/her fragment(s) $F_1$, $F_2$ and $F_3$ of the wrap $W_4$ for the next participant. When the participant saves the composite document CD and does not release it, the original participant's workflow wrap is retained in place at least until the next iteration and when he/she releases the document CD.

In one example of the scenario shown in FIG. 5, a visual indicator may also be associated with the wrap $W_4$. In addition to using the fragments $F_1$, $F_2$, and $F_3$, this example involves splitting a known string of characters (e.g., a word or phrase) among the participants $P_1$, $P_2$, and $P_3$ in the group G and providing the respective split portions in the respective participants' map-files $map_1$, $map_2$, $map_3$. The participant $P_1$, $P_2$, and $P_3$ accesses his/her map-file(s) $map_1$, $map_2$, $map_3$ and performs his/her workflow task(s), and the subsequent release of the composite document CD releases his/her assigned fragment(s) $F_1$, $F_2$, $F_3$ and the decrypted split portion of the string of characters contained in his/her map-file(s) $mag_1$, $map_2$, $map_3$. The decrypted and released characters to the otherwise known phrase can verify the status of the composite document CD.

For example, the phrase "the document is ready to be shipped" may be split into the map-files $map_1$, $map_2$, $map_3$ of the three participants $P_1$, $P_2$, and $P_3$ in group G. The phrase contains 35 characters (with spaces), which may be split in any desirable manner. For example, the phrase may be split into three portions including: "the document" (12 characters) as the first portion, "is ready to" (12 characters) as the second portion, and "be shipped" (11 characters) as the third portion. A respective portion is placed into the corresponding map-file $map_1$, $map_2$, $map_3$; of the participants $P_1$, $P_2$, and $P_3$, and is subsequently released when he/she releases the composite document CD. When the full phrase is recovered, it is clear that the document can be shipped along its workflow. However, if two of the portions are decrypted and the third portion is not decrypted, the phrase may appear as "the document is ready to A#7¬ ⌞ JΩi☻+♣", for example. This incomplete phrase indicates to the workflow participants that this stage of the workflow has not been completed, and the document CD is not ready to be shipped. This may be used to avoid accidental shipment to the participant $P_4$.

Referring now to FIG. 6, an example of a workflow including an unordered stage followed by another unordered stage is depicted. While two stages of the workflow are shown in FIG. 6, it is to be understood that the workflow may include any number of stages. When moving from an unordered stage to another unordered stage, the composite document CD is released to multiple participants (e.g., participants $P_5$, $P_6$, and $P_7$ in FIG. 6) in a second group G2 after each participant $P_1$, $P_2$, $P_3$, and $P_4$ from a first group G has contributed (e.g., accessed the document CD, performed his/her tasks, etc.).

In this example, the wrap $W_{G2}$ of the second group G2 is partitioned such that each participant $P_1$, $P_2$, $P_3$, and $P_4$ from the group G releases some chunk/part (e.g., fragment $F_1$, $F_2$, $F_3$, or $F_4$) of each map-file $map_5$, $map_6$, $map_7$ for the participants $P_5$, $P_6$, and $P_7$ of the subsequent group G2. Access to the second group G2 is thus provided by the map-files $map_5$, $map_6$, $map_7$ within the wrap $W_{G2}$. In other words, the wrap $W_{G2}$ includes a set of map-files $map_5$, $map_6$, $map_7$ for the group G2, and this data is split for release among the workflow participants in the previous group G.

Each of the map-files $map_5$, $map_6$, $map_7$ is broken into a number of fragments $F_1$, $F_2$, $F_3$, or $F_4$ that is equal or larger than the number of participants in the first (or previous) group G. Each participant $P_1$, $P_2$, $P_3$, and $P_4$ from the group G should receive (in his/her wrap) some, but not all, of the fragments $F_1$, $F_2$, $F_3$, or $F_4$ from each of the map-files $map_5$, $map_6$, $map_7$. To illustrate this concept, in the example shown in FIG. 6, participant $P_1$ may receive, in his/her wrap, fragment $F_1$ from each of the map-files $map_5$, $map_6$, $map_7$. However, participant $P_1$ will not receive, in his/her wrap, all of the fragments $F_1$, $F_2$, $F_3$, and $F_4$ from any one of the map-files $map_5$, $map_6$, $map_7$. Since each participant $P_1$, $P_2$, $P_3$, $P_4$ alone can release his/her fragment(s) $F_1$, $F_2$, $F_3$, or $F_4$, each participant $P_1$, $P_2$, $P_3$, and $P_4$ has to access the document CD (and, in some instances, perform his/her assigned task(s)) before his/her fragments $F_1$, $F_2$, $F_3$, or $F_4$ can be released. This ensures that each of first group participants $P_1$, $P_2$, $P_3$, and $P_4$ must release their fragments $F_1$, $F_2$, $F_3$, or $F_4$ before any participant $P_5$, $P_6$, and $P_7$ from the second group G2 has his/her map-file $map_5$, $map_6$, $map_7$ complete and is able to access the document.

In the example shown in FIG. 6, the group G of four unordered participants $P_1$, $P_2$, $P_3$, and $P_4$ is followed by the second group G2 of three unordered participants $P_5$, $P_6$, and $P_7$. In this example, the map-files $map_5$, $map_6$, $map_7$ are illustrated by the rectangles and are each divided into four approximately equal (although in other instances they are not equal) parts (based upon the number of participants in the first group G), and the corresponding fragments $F_1$, $F_2$, $F_3$, and $F_4$ (which, in this example, are respectively assigned to each participant $P_1$, $P_2$, $P_3$, and $P_4$) are assembled with the parts. In this example, all of the fragments $F_1$ are set to be released by the first workflow participant $P_1$, all of the fragments $F_2$ are set to be released by the second workflow participant $P_2$, all of the fragments $F_3$ are set to be released by the third workflow participant $P_3$, and all of the fragments $F_4$ are set to be released by the fourth workflow participant $P_4$. Therefore, each workflow participant $P_1$, $P_2$, $P_3$, $P_4$ from group G must contribute before any participant $P_5$, $P_6$, $P_7$ from group G2 can access the document.

The map-files $map_5$, $map_6$, $map_7$ are encrypted, respectively, using keys known by or provided to participants $P_5$, $P_6$, and $P_7$. Since the map-files $map_5$, $map_6$, $map_7$ are encrypted, releasing some of the fragments (e.g., $F_1$ and $F_2$ but not $F_3$ and $F_4$) will not provide partial access. As such, in the example shown in FIG. 6, no individual map-files $map_5$, $map_6$, $map_7$ can be assembled and released until each workflow participant $P_1$, $P_2$, $P_3$, and $P_4$ from the first group G has participated. For example, participant $P_5$ cannot decrypt his map-file $map_5$ until all of the participants $P_1$, $P_2$, $P_3$, and $P_4$ from the group first G have completed their task(s) and released their respective fragments $F_1$, $F_2$, $F_3$, and $F_4$.

It is to be understood that the example of FIG. 6 can be further generalized, where access of some participants $P_1$, $P_2$, $P_3$, and $P_4$ from the first group G is not mandatory. In these instances, the mandatory participants (e.g., participants $P_1$, $P_2$, $P_3$) should be able to fully release the map-files $map_5$, $map_6$, $map_7$. In these instances, the fragments $F_1$, $F_2$, $F_3$, or $F_4$ would be divided among the mandatory participants $P_1$, $P_2$, $P_3$, and the optional participant (e.g., $P_4$) of the first group G may not be given any fragments to release or may be given fragments that overlap with the fragments of the mandatory participants $P_1$, $P_2$, P3. This scenario may occur when there are no predefined mandatory/optional participants, but rather there is some predefined number of participants from the group G that must access before the document is released to the next group G2. As mentioned above, this control can be achieved, in one example, by providing overlapping fragments for participants, such that any subset of them is able to fully release the map-files $map_5$, $map_6$, $map_7$.

In the example shown in FIG. 6, it is to be understood that the wrap $W_{G2}$ may also include subsequent workflow steps beyond the second group G2.

The examples of the method and system disclosed herein allow mixed workflows to be enforced. This enables collaborative document creation and unordered access without compromising the workflow or restricting the types of stages that can be included in the workflow.

While several examples have been described in detail, it will be apparent to those skilled in the art that the disclosed examples may be modified. Therefore, the foregoing description is to be considered non-limiting.

What is claimed is:

1. A document management system, comprising:
   a composite document (CD);
   a mixed workflow associated with the composite document (CD), the mixed workflow including an unordered stage followed by one of i) an ordered stage or ii) an other unordered stage;
   a map-file (map) of the composite document (CD) for a participant in the mixed workflow that is associated with the ordered stage or the other unordered stage; and
   a wrap (W) of the map-file (map), the wrap (W) including a number of map-file fragments (F) equal to or greater than a number of workflow participants (P) within, a group (G) that is associated with the unordered stage, the number of map-file fragments (F) rendering the composite document (CD) inaccessible to the participant (P) that is associated with the ordered stage or the other unordered stage until each of the number of map-file fragments (F) is released by each of the workflow participants (P) within the group that is associated with the unordered stage.

2. The document management system as defined in claim 1 wherein each of the workflow participants (P) within the group (G) is assigned at least one of the map-file fragments (F).

3. The document management system as defined in claim 1, further comprising a visible indicator associated with the wrap (W), wherein the visible indicator is a word or phrase that is divided into a number of portions equal to the number of workflow participants (P) within the group (G) that is associated with the unordered stage and is complete when the number of map-file fragments (F) are released.

4. The document management system as defined in claim 1 wherein the number of workflow participants (P) within the group (G) is greater than 1, wherein the participant (P) that is associated with the ordered stage is a single participant, and wherein the system further comprises a key of the single participant (P) that encrypts the composite document (CD) after its release from the group (G).

5. The document management system as defined in claim 1 wherein the number of workflow participants (P) within the group is greater than 1, wherein the participant (P) that is associated with the other unordered stage is a second group (G2) with a second number of workflow participants (P) that is greater than 1, and wherein the document management system further includes a respective map-file (map) for each of the workflow participants (P) in the second group (G2).

6. The document management system as defined in claim 5 wherein each of the respective map-files (map) includes:
   a number of parts corresponding with the number of workflow participants (P) in the group (G); and
   respective, map-file fragments (F), each of which is associated with one of the parts and is assembled according to the workflow participants (P) within the group (G).

7. The document management system as defined in claim 1 wherein the composite document (CD) is:
   non-releasable to the participant (P) that is associated with the ordered stage or the other unordered stage when any one of the map-file fragments (F) has not been released; and
   releasable to the participant (P) that is associated with the ordered stage or the other unordered stage after all of the map-file fragments (F) are released.

8. The document management system as defined in claim 1, further comprising a public-posting system that supports the composite document (CD).

9. A document management method, comprising:
   generating a mixed workflow for a composite document (CD); and
   generating a wrap (W) for a workflow participant, the wrap (W) including multiple parts that are either i) all releasable by the workflow participant (P) or ii) respectively releasable by other workflow participants (P) that precede the workflow participant (P) in the mixed workflow;

wherein generating the mixed workflow includes creating the mixed workflow so that an unordered stage is followed by one of i) an ordered stage or ii) an other unordered stage; and wherein the method further includes:

generating a map-file (map) of the composite document (CD) for a participant (P) in the mixed workflow that is associated with the ordered stage or the other unordered stage;

generating the wrap (W) so that the wrap (W) is of the map-file (map) and splitting the wrap (W) of the map-file (map) into a number of map-file fragments (F) equal to or greater than a number of workflow participants (P) within a group (G) that is associated with the unordered stage, the number of map-file fragments (F) rendering the composite document (CD) inaccessible to the participant (P) that is associated with the ordered stage or the other unordered stage until each of the number of map-file fragments (F) is released by each of the workflow participants (P) within the group (G) that is associated with the unordered stage.

10. The document management method as defined in claim 9, further comprising releasing the composite document (CD) to the participant (P) that is associated with the ordered stage or the other unordered stage after all of the map-file fragments (F) are released by the number of workflow participants (P) within the group (G).

11. The document management method as defined in claim 9, further comprising dividing a word or phrase into a number of portions equal to the number of workflow participants (P) within the group (G) that is associated with the unordered stage to generate a visible indicator that is complete when the number of map-file fragments (F) is released.

12. The document management method as defined in claim 9 wherein the number of workflow participants (P) within the group (G) is greater than 1, wherein the participant (P) that is associated with the ordered stage is a single participant (P), and wherein the method further comprises encrypting the composite document (CD) after its release from the group (G) using a key of the single participant (P).

13. The document management method as defined in claim 9 wherein the number of workflow participants (P) within the group (G) is greater than 1, wherein the participant (P) that is associated with the other unordered stage is a second group (G2) with a second number of workflow participants (P) that is greater than 1, and wherein the method further includes:

generating a respective map-file (map) for each of the workflow participants (P) in the second group (G2); and splitting the respective map-files (map) into respective map-file fragments (F) that equal the number of workflow participants (P) within the group (G).

14. The document management method as defined in claim 9 wherein generating the mixed workflow includes creating the mixed workflow so that an ordered stage is followed an unordered stage and wherein the multiple parts of the wrap (W) include encrypted map-files (map) for workflow participants (P) in the unordered stage.

* * * * *

UNITED STATES PATENT AND TRADEMARK OFFICE
CERTIFICATE OF CORRECTION

PATENT NO. : 9,600,448 B2
APPLICATION NO. : 13/885953
DATED : March 21, 2017
INVENTOR(S) : Helen Balinsky et al.

Page 1 of 1

It is certified that error appears in the above-identified patent and that said Letters Patent is hereby corrected as shown below:

In the Claims

In Column 12, Line 6, in Claim 1, delete "within," and insert -- within --, therefor.

In Column 12, Line 46, in Claim 6, delete "respective," and insert -- respective --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*